US011913222B2

United States Patent
Letts et al.

(10) Patent No.: US 11,913,222 B2
(45) Date of Patent: *Feb. 27, 2024

(54) POLYISOCYANURATE COVERBOARDS WITH IMPROVED FIRE RESISTANCE

(71) Applicant: Holcim Technology Ltd, Zug (CH)

(72) Inventors: John B. Letts, Carmel, IN (US); Chunhua Yao, Carmel, IN (US); Michael J. Hubbard, Murfreesboro, TN (US)

(73) Assignee: Holcim Technology Ltd, Zug (CH)

( * ) Notice: Subject to any disclaimer, the term of this patent is extended or adjusted under 35 U.S.C. 154(b) by 4 days.

This patent is subject to a terminal disclaimer.

(21) Appl. No.: 17/592,178

(22) Filed: Feb. 3, 2022

(65) Prior Publication Data

US 2022/0154453 A1 May 19, 2022

Related U.S. Application Data

(63) Continuation of application No. 17/131,160, filed on Dec. 22, 2020, now Pat. No. 11,242,681, which is a
(Continued)

(51) Int. Cl.
*E04B 1/94* (2006.01)
*B32B 5/02* (2006.01)
(Continued)

(52) U.S. Cl.
CPC .............. *E04B 1/942* (2013.01); *B32B 5/022* (2013.01); *B32B 5/18* (2013.01); *B32B 17/10* (2013.01);
(Continued)

(58) Field of Classification Search
CPC ....... B32B 11/042; B32B 13/14; B32B 15/14; B32B 15/18; B32B 17/10; B32B 21/02;
(Continued)

(56) References Cited

U.S. PATENT DOCUMENTS 9,097,011 B1 * 8/2015 Barone ................. B05D 7/02
9,605,433 B2 3/2017 Paradis et al.
(Continued)

OTHER PUBLICATIONS

DensDeck Prime Roof Board with EONIC technology Technical Guide, US.

*Primary Examiner* — Hai Vo
(74) *Attorney, Agent, or Firm* — Arthur M. Reginelli; Renner, Kenner (57) ABSTRACT

A construction board includes a foam body having first and second planar surfaces, said foam body including a polyisocyanurate foam matrix defining a plurality of closed cells, said closed cells being at least substantially devoid of hydrocarbon blowing agents, and said foam body being characterized by a density, pursuant to ASTM C303, of at least 2.5 lbs/ft³; and a facer disposed on a planar surface of said foam body, said facer including a glass substrate having an internal planar surface proximate to said foam body and an external planar surface opposite said foam body, a first coating disposed on said external surface, and a second coating disposed on or proximate to said internal surface, where said first coating disposed on said external surface includes an inert filler, and where said second coating disposed on or proximate to said internal surface includes intumescent material.

17 Claims, 3 Drawing Sheets

Related U.S. Application Data continuation of application No. 15/972,691, filed on May 7, 2018, now abandoned.

(60) Provisional application No. 62/501,802, filed on May 5, 2017.

(51) Int. Cl.

| | | |
|---|---|---|
| *B32B 5/18* | (2006.01) | |
| *B32B 17/10* | (2006.01) | |
| *B32B 33/00* | (2006.01) | |
| *B32B 37/18* | (2006.01) | |
| *C03C 25/26* | (2018.01) | |
| *C03C 25/47* | (2018.01) | |
| *E04B 7/22* | (2006.01) | |
| *E04C 2/10* | (2006.01) | |
| *E04C 2/20* | (2006.01) | |
| *E04D 3/35* | (2006.01) | |
| *E04D 13/16* | (2006.01) | |

(52) U.S. Cl.
CPC ............ *B32B 33/00* (2013.01); *B32B 37/182* (2013.01); *C03C 25/26* (2013.01); *C03C 25/47* (2018.01); *E04B 7/22* (2013.01); *E04C 2/10* (2013.01); *E04C 2/205* (2013.01); *E04D 3/352* (2013.01); *E04D 13/16* (2013.01); *B32B 2250/05* (2013.01); *B32B 2250/40* (2013.01); *B32B 2255/02* (2013.01); *B32B 2255/26* (2013.01); *B32B 2262/101* (2013.01); *B32B 2264/10* (2013.01); *B32B 2264/104* (2013.01); *B32B 2264/108* (2013.01); *B32B 2264/203* (2020.08); *B32B 2266/0278* (2013.01); *B32B 2266/08* (2013.01); *B32B 2307/3065* (2013.01); *B32B 2307/718* (2013.01); *B32B 2419/06* (2013.01); *C03C 2217/475* (2013.01); *C03C 2217/48* (2013.01)

(58) Field of Classification Search
CPC ....... B32B 21/045; B32B 21/08; B32B 21/10; B32B 2250/05; B32B 2250/40; B32B 2255/02; B32B 2255/10; B32B 2255/20; B32B 2255/26; B32B 2255/28; B32B 2260/021; B32B 2260/046; B32B 2262/101; B32B 2264/10; B32B 2264/104; B32B 2266/0214; B32B 2266/0278; B32B 2266/049; B32B 2266/08; B32B 2307/3065; B32B 2307/712; B32B 2307/718; B32B 2307/72; B32B 2307/724; B32B 2307/732; B32B 2419/06; B32B 25/16; B32B 2607/00; B32B 27/304; B32B 27/32; B32B 3/26; B32B 33/00; B32B 37/182; B32B 5/022; B32B 5/028; B32B 5/18; B32B 5/20; B32B 5/245; C03C 2217/475; C03C 2217/48; C03C 25/26; C03C 25/47; E04B 1/942; E04B 7/22; E04C 2/10; E04C 2/205; E04D 13/16; E04D 3/352

See application file for complete search history.

(56) References Cited

U.S. PATENT DOCUMENTS

| | | |
|---|---|---|
| 2006/0179749 A1 | 8/2006 | Brandt et al. |
| 2010/0031603 A1 | 2/2010 | Letts et al. |
| 2015/0078821 A1* | 3/2015 | Tackett .................. E01C 3/006 244/114 R |
| 2017/0022704 A1 | 1/2017 | Bertucelli et al. |
| 2021/0108408 A1* | 4/2021 | Letts ......................... B32B 3/26 |

\* cited by examiner

POLYISOCYANURATE COVERBOARDS WITH IMPROVED FIRE RESISTANCE

This application is a continuation application of U.S. application Ser. No. 17/131,160 filed on Dec. 22, 2020, which claims the benefit U.S. application Ser. No. 15/972,691 filed on May 7, 2018, which claims the benefit of U.S. Provisional Application Ser. No. 62/501,802 filed on May 5, 2017, which are incorporated herein by reference.

FIELD OF THE INVENTION

Embodiments of the present invention are directed toward composite high density polyisocyanurate cover boards that have improved fire properties due, at least in part, to the absence of a hydrocarbon blowing agent and the presence of a glass facer that includes an external coating including inert filler and an interfacial coating including intumescent material.

BACKGROUND OF THE INVENTION

Coverboards and recovery boards are often used in commercial roofing systems to provide roofs with fire barrier properties, protection from foot traffic, and protection from environmental forces such as hail. A commonly used coverboard is a fiberglass faced gypsum board, which is sold under the tradename DENSDECK. Notably, these boards have found wide acceptance because they are noncombustible, per ASTM E136, have been certified by UL for fire resistance under the 790 and 1256 classifications, meet FM class 1 approvals for metal decks, and meet ASTM E84 standards for flame and smoke. While fire resistant and dimensionally stable, these construction boards have appreciable weight and structure, which impacts transportation, movement on a job site, and overall ease of installation. There is a desire, therefore, for construction boards with similar fire resistance and dimensional stability that are lighter and more manageable (e.g., easier to cut).

Polyisocyanurate coverboards are known. For example, U.S. Publication No. 2006/0179749 teaches high density polyisocyanurate construction boards for use as a coverboard or recover board. These boards may be characterized by having a density above 2.5 lbs/ft$^3$ and an index of at least 175. These boards can include a hydrocarbon, such as a pentane isomer, as an insulating agent, which compounds also serve as blowing agents during the manufacture of the foam. These construction boards also carry facer materials such as cellulosic, glass, or foil facers. In order to provide these boards with fire resistance, a fire retardant, such as tri(monochloropropyl) phosphate is included within the foam forming materials, especially in the presence of flammable blowing agents such as pentane isomers.

U.S. Publication No. 2010/0031603 is likewise directed toward high density polyisocyanurate construction boards that meet the requirements imposed by UL 790 for flame spread. These boards have a density of greater than 2.5 lbs/ft$^3$, an iso index of at least 270, and a cellular body that includes at least 5.0 wt. % flame retardant.

While polyisocyanurate coverboards and recover boards are widely used in the industry, they do not meet all of the standards, especially those related to flame resistance, that have been achieved by fiberglass faced gypsum board.

SUMMARY OF THE INVENTION

One or more embodiments of the present invention provide a construction board comprising a foam body having first and second planar surfaces, said foam body including a polyisocyanurate foam matrix defining a plurality of closed cells, said closed cells being at least substantially devoid of hydrocarbon blowing agents, and said foam body being characterized by a density, pursuant to ASTM C303, of at least 2.5 lbs/ft$^3$; and a facer disposed on a planar surface of said foam body, said facer including a glass substrate having an internal planar surface proximate to said foam body and an external planar surface opposite said foam body, a first coating disposed on said external surface, and a second coating disposed on or proximate to said internal surface, where said first coating disposed on said external surface includes an inert filler, and where said second coating disposed on or proximate to said internal surface includes intumescent material.

DETAILED DESCRIPTION OF ILLUSTRATIVE EMBODIMENTS

Embodiments of the invention are based, at least in part, on the discovery of high density polyisocyanurate coverboards that demonstrate improved flame resistance. In one or more embodiments, the polyisocyanurate boards are substantially devoid of hydrocarbon blowing agents and carry a glass facer that includes an external coating including inert filler and an interfacial coating that includes intumescent filler. In particular embodiments, the facer also includes an intermediary layer including inert filler. Advantageously, the coverboards of the present invention have zero flame spread and zero smoke development when tested in accordance with ASTM E84. While the high density polyisocyanurate boards contemplated in the prior art have increased flame resistance, owing in part to the high levels of flame retardant used within the boards, the prior art high density boards do not meet the requirements of a class 1 roof according to ASTM E84. Additionally, it is contemplated that the coverboards of the present invention can be used to prepare roof systems over both combustible and non-combustible decks that meet the requirements of UL 790 without the use of gypsum-based construction boards. It is also contemplated that the coverboards of the present invention can achieve FM class 1 approvals for steel deck insulated roofs without the use of gypsum-based coverboards.

Coverboard Construction

Figure 1:
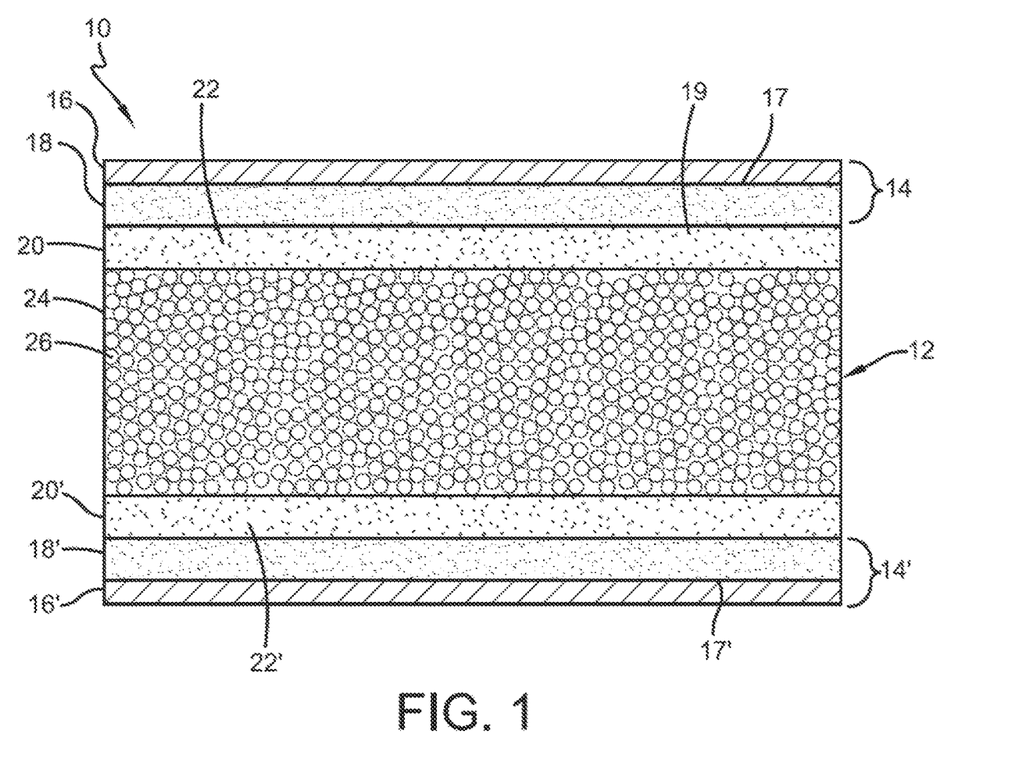
FIG. 1 is a cross-sectional view of a coverboard according to aspects of the present invention.

Construction boards according to embodiments of the present invention can be described with reference to FIG. 1, which shows construction board 10, which may also be referred to as coverboard 10, recoverboard 10, roof board 10, fire-barrier board 10, or simply board 10. As shown, board 10, which is generally planar in configuration, includes foam body 12, which may also be referred to as foam core 12, and at least one facer 14. In one or more embodiments, board 10 also includes an opposed facer 14'.

Facer 14, as well as optional facer 14', includes glass substrate 18, 18', external coating 16, 16', and interfacial coating 20, 20'. External coating 16, 16' includes inert filler. Interfacial coating 20, 20' includes intumescent material 22, 22'.

It should be appreciated that interfacial coating 20, 20' is disposed between foam body 12 and glass substrate 18. External coating layers 16, 16', on the other hand, are disposed on the external surface 17, 17' of glass substrate 18, which is opposite foam core 12 and internal surface 19 of glass substrate 18 onto which intermediary coating 20 is disposed.

Figure 2:
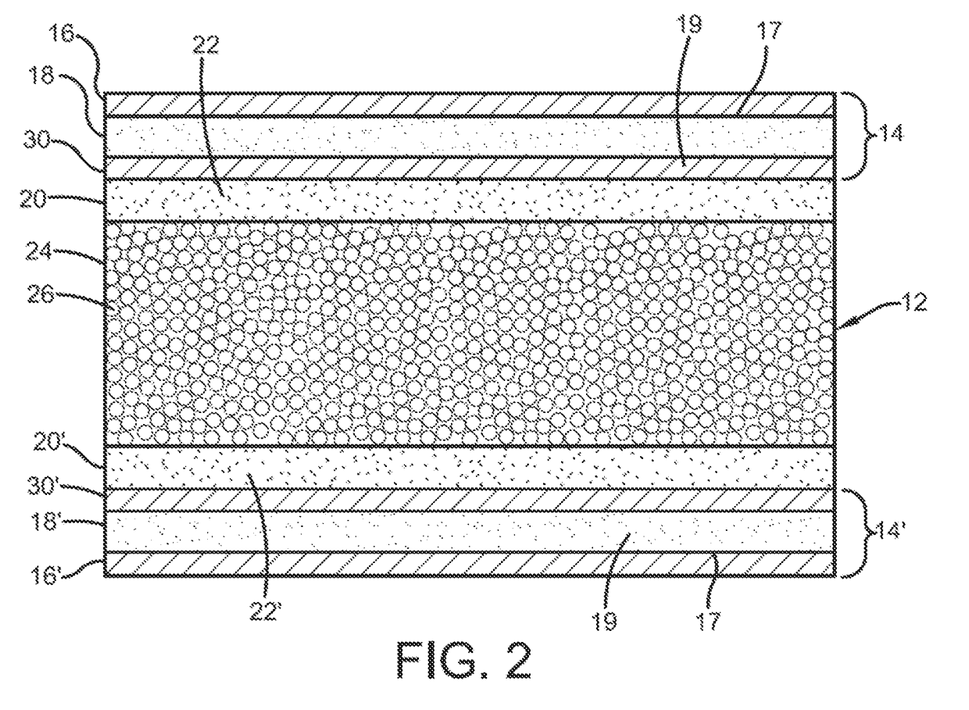
FIG. 2 is a cross-sectional view of a coverboard according to aspects of the present invention.

An alternate embodiment is shown in FIG. 2, where coverboard 10' likewise includes foam body 12, facer 14, and optional facer 14'. Facer 14, 14' include external coating 16, 16', and interfacial coating 20, 20'. Additionally, facer 14, 14' includes an additional coating layer 30, 30' disposed between glass substrate 18, 18' and interfacial coating 20, 20'. In one or more embodiments, additional coating layer 30, 30', which may be referred to as internal coating layer 30, 30', is compositionally the same or similar to external coating 16, 16'. As should be evident from FIG. 2, interfacial coating layer 30, 30' is not disposed on internal surface 19 of substrate 18 but is instead proximate thereto since it is disposed on coating 30.

Foam Core

In one or more embodiments, foam layer 12 includes a rigid closed-cell foam structure. In one or more embodiments, foam layer 12 may include a polyurethane or polyisocyanurate foam. As the skilled person appreciates, the closed-cell foam includes a plurality of cells and an interconnected network of solid struts or plates that form the edges and faces of the cells. The solid portion (i.e., the interconnected network) is formed from the foam-forming material (e.g., the polyurethane or polyisocyanurate). The solid portion of foam layer 12 (i.e., the matrix) may include other constituents as is generally known in the art. As will be discussed in greater detail below, additional frame or fire-resistant materials can be dispersed within the solid portion of foam layer 12. Additionally, in one or more embodiments, the expandable graphite can be dispersed within the solid portion of foam layer 12 in combination with a non-halogenated flame retardant.

In one or more embodiments, foam layer 12 may be characterized by density that is greater than 2.5 pounds per cubic foot (12.2 $kg/m^2$), as determined according to ASTM C303, in other embodiments the density is greater than 2.8 pounds per cubic foot (13.7 $kg/m^2$), in other embodiments greater than 3.0 pounds per cubic foot (14.6 $kg/m^2$), and still in other embodiments greater than 3.5 pounds per cubic foot (17.1 $kg/m^2$). In one or more embodiments, the density of foam layer 12 of the recovery boards may be less than 20 pounds per cubic foot (97.6 $kg/m^2$), in other embodiments less than 10 pounds per cubic foot (48.8 $kg/m^2$), in other embodiments less than 6 pounds per cubic foot (29.3 $kg/m^2$), in other embodiments less than 5.9 pounds per cubic foot (28.8 $kg/m^2$), in other embodiments less than 5.8 pounds per cubic foot (28.3 $kg/m^2$), in other embodiments less than 5.7 pounds per cubic foot (27.8 $kg/m^2$), in other embodiments less than 5.6 pounds per cubic foot (27.3 $kg/m^2$), and still in other embodiments less than 5.5 pounds per cubic foot (26.9 $kg/m^2$). Foam construction boards having a foam layer of similar nature are described in U.S. Publ. Nos. 2006/0179749 and 2010/0031603, which are incorporated herein by reference.

Where the density of foam layer 12 is greater than 2.5 pounds per cubic foot, it may be advantageous for foam layer 12 to be characterized by an ISO Index, as determined by PIR/PUR ratio as determined by IR spectroscopy using standard foams of known index (note that ratio of 3 PIR/PUR provides an ISO Index of 300) of at least 180, in other embodiments at least 200, in other embodiments at least 220, in other embodiments at least 270, in other embodiments at least 285, in other embodiments at least 300, in other embodiments at least 315, and in other embodiments at least 325. In these or other embodiments, the ISO Index may be less than 360, in other embodiments less than 350, in other embodiments less than 340, and in other embodiments less than 335.

In one or more embodiments, the thickness of foam layer 12 may be greater than 0.5 cm, in other embodiments greater than 1, and in other embodiments greater than 2 cms. In these or more embodiments, the thickness of foam layer 12 may be less than 15 cm, in other embodiments less than 12, and in other embodiments less than 8 cms. In one or more embodiments, the thickness of foam layer 12 may be from about 0.5 to about 15 cms, in other embodiments from about 1 to about 12 cms, and in other embodiments from about 2 to about 8 cms.

According to aspects of the present invention, foam body 12, which includes cellular matrix 24 that forms closed cells 26 is substantially devoid of hydrocarbon blowing agents. Substantially devoid refers to that amount or less that does not have an appreciable impact on the construction boards of the present invention, particularly as the impact relates to the flammability of the construction boards. In one or more embodiments, closed cells 26 include carbon dioxide, air, or a vacuum or partial vacuum. As those skilled in the art appreciate, the presence of carbon dioxide can result from the use of water as a blowing agent during the manufacture of the foam. These techniques will be described in greater detail below. In one or more embodiments, foam body 12, and more particularly closed cells 26, include less than 2, in other embodiments less than 0.5, and in other embodiments less than 0.1 percent by volume hydrocarbon blowing agents. In particular embodiments, closed cells 26 are devoid of halogenated organic compounds.

Glass Substrate

In one or more embodiments, substrate 18, 18' is an inorganic substrate. In particular embodiments, the substrate is a non-woven glass mat, and therefore reference may be made to glass mat 18, 18'. In one or more embodiments, the non-woven fiberglass mats include glass fibers and a binder that binds the glass fibers together and maintains the fibers in a mat form. Any type of glass fiber mat can be used in the composite board. For example, a non-woven glass fiber mat can be made with glass fibers, the fibers can be bonded with an aqueous thermosetting resin such as, for example, urea formaldehyde or phenolic resole resins. As the skilled person will appreciate, these binder resins are conventional in the art of non-woven glass mats, and the skilled person will understand that the coating (e.g., coating 16, 16'), as taught herein, is distinct, in both composition and structure, from this binder.

In one or more embodiments, the dimensional and weight characteristics of glass substrate 18, 18' are not particularly limited, and can depend on the specific application and desired properties of the coverboard. For example, the basis weight of glass substrate 22 (or 32) can be from about 50 grams per square meter to about 150 grams per square meter. The thickness of glass substrate 22 (or 32) can be, for example, from about 0.015 inch to about 0.05 inch (about 0.038 to about 0.13 cm). The basis weight and thickness characteristics can be adjusted depending upon the desired rigidity, strength and weight of the composite board.

In one or more embodiments, the thickness of glass substrate 22 (or 32) (absent the coating layer described herein) may be from about 0.01 to about 1.00 inch (about 0.03 to about 2.54 cm) or in other embodiments from about 0.015 to about 0.05 inches thick (about 0.038 to about 0.13 cm).

The dimensional and weight characteristics of the glass fiber mat are not particularly limited, and can depend on the specific application and desired properties of the composite board. For example, the basis weight of the glass fiber mat can be from about 50 grams per square meter to about 150 grams per square meter. The thickness of the glass fiber mat can be, for example, from about 0.015 inch to about 0.05 inch. The basis weight and thickness characteristics can be adjusted depending upon the desired rigidity, strength and weight of the composite board.

The thickness of the facer material may vary; for example, it may be from about 0.01 to about 1.00 or in other embodiments from about 0.015 to about 0.050 inches thick.

External Coating

In one or more embodiments, facers 14, 14' include one or more coating layers (e.g., coating layers 16 and 20), and optionally coating material disposed within the interstices of the mat, which coating material is referred to as penetrated coating material. As explained above, the penetrated coating is to be distinguished from any binder used to form the glass mat itself, such as those binders used to hold the nonwoven fibers of the glass mat together.

In one or more embodiments, external coating 16, 16' includes an inert filler dispersed within a binder or matrix. In one or more embodiments, the external coating includes an inorganic filler or mineral filler dispersed throughout a binder. In one or more embodiments, the external coating is devoid or substantially devoid of intumescent material.

In one or more embodiments, external coating 16, 16' may have a thickness of at least 0.005 mm, in other embodiments at least 0.01 mm, in other embodiments 0.05 mm, and in other embodiments at least 0.09 mm. In these or other embodiments, coating 16, 16' may have a thickness of less than 1.5 mm, in other embodiments less than 1.0 mm, in other embodiments less than 0.7 mm, in other embodiments less than 0.3 mm, and in other embodiments less than 0.1 mm.

In one or more embodiments, the concentration of filler within external coating 16, 16' may be expressed as the weight of filler relative to the entire weight of the layer. In one or more embodiments, the amount of filler within the external coating 16, 16' may be more than 0.5 wt. %, in other embodiments more than 1.0 wt. %, and in other embodiments more than 3.0 wt. %. In these or more embodiments, the amount of filler within the external coating 16, 16' may be less than 50 wt. %, in other embodiments less than 40 wt. %, and in other embodiments less than 30 wt. %. In one or more embodiments, the amount of filler within the external coating 16, 16' may be from about 0.5 to about 50 wt. %, in other embodiments from about 1.0 to about 40 wt. %, and in other embodiments from about 3.0 to about 30 wt. %.

In one or more embodiments, the thickness of coating 16, 16' may be greater than 0.5 mm, in other embodiments greater than 1 mm, and in other embodiments greater than 1.5 mm. In these or more embodiments, the thickness of coating 16, 16' (as well as coating 34) may be less than 7 mm, in other embodiments less than 5 mm, and in other embodiments less than 3 mm. In one or more embodiments, the thickness of coating 16, 16' may be from about 0.5 to about 7 mm, in other embodiments from about 1 to about 5 mm, and in other embodiments from about 1.5 to about 3 mm.

In one or more embodiments, the binder may include natural or synthetic materials. For example, natural materials may include natural rubber, waxes and starches. Synthetic materials may include polyolefins, styrene-butadiene copolymers, polyvinyl chlorides, acrylic polymers, and methacrylic polymers, silicones, and copolymers thereof including functional copolymers thereof. For example, the binders may include styrene-butadiene polymers bearing one or more hydrophobic moieties (e.g., fluorine-containing groups) for repelling water. Still other examples include, but not limited to, polyurethane coating compositions, polymeric resin coating compositions, and siloxane coating compositions, as well as polymer-modified asphalt or bitumen coating compositions. These polymers may derive from latex compositions that carry one or more of the polymers.

In one or more embodiments, external layer 16, 16' can include from about 1 wt % to about 15 wt %, or in other embodiments from about 2 to about 10 wt %, binder based on the weight of the respective layers.

Examples of a suitable inert filler include calcium carbonate, clay, talc, mica, perlite, hollow ceramic spheres or a combination thereof. In an exemplary embodiment, the inert filler is calcium carbonate.

In one or more embodiments, external layer 16, 16' can include from about 80 wt. % to about 98 wt. %, or in other embodiments from 85 wt. % to about 95 wt. % inert filler based on the weight of each respective layer.

Interfacial Layer-Intumescent Material

As suggested above, interfacial layer 20, 20' includes intumescent material dispersed within a binder. In particular embodiments, the intumescent material is expandable graphite. In one or more embodiments, interfacial layer 20, 20', which may also be referred to as interfacial coating 20, 20', includes a complementary filler such as inert filler or inorganic filler. In other embodiments, interfacial layer 20, 20' is devoid or substantially devoid of filler other than intumescent material.

In one or more embodiments, the thickness of interfacial layer 20, 20' may be greater than 1 µm, in other embodiments greater than 20 µm, and in other embodiments greater than 50 µm. In these or other embodiments, the thickness or interfacial layer 20, 20' may be less than 5 mm, in other embodiments less than 1 mm, and in other embodiments less than 0.5 mm. In one or more embodiments, the thickness of interfacial layer 20, 20' may be from about 1 µm to about 5 mm, in other embodiments from about 20 µm to about 1 mm, and in other embodiments from about 50 µm to about 0.5 mm.

In one or more embodiments, the concentration of intumescent material (e.g., expandable graphite) within interfacial layer 20, 20' may be expressed as the weight of intumescent material relative to the entire weight of the layer. In one or more embodiments, the amount of intumescent material within the interfacial layers may be more than 0.5 wt. %, in other embodiments more than 1.0 wt. %, and in other embodiments more than 3.0 wt. %. In these or more embodiments, the amount of intumescent material within the interfacial layers may be less than 50 wt. %, in other embodiments less than 40 wt. %, and in other embodiments less than 30 wt. %. In one or more embodiments, the amount of intumescent material within the interfacial layers may be from about 0.5 to about 50 wt. %, in other embodiments from about 1.0 to about 40 wt. %, and in other embodiments from about 3.0 to about 30 wt. %.

In one or more embodiments, the binder may include natural or synthetic materials. For example, natural materials may include natural rubber, waxes and starches. Synthetic materials may include polyolefins, styrene-butadiene copolymers, polyvinyl chlorides, acrylic polymers, and methacrylic polymers, silicones, and copolymers thereof including functional copolymers thereof. For example, the binders may include styrene-butadiene polymers bearing one or more hydrophobic moieties (e.g., fluorine-containing groups) for repelling water. Still other examples include, but not limited to, polyurethane coating compositions, polymeric resin coating compositions, and siloxane coating compositions, as well as polymer-modified asphalt or bitumen coating compositions.

In one or more embodiments, complementary fillers include, but are not limited to, In one or more embodiments, the fire-resistant materials may include inorganic mineral fillers such as clays, silicates, titanium dioxide, talc (magnesium silicate), mica (mixtures of sodium and potassium aluminum silicate), alumina trihydrate, antimony trioxide, calcium carbonate, titanium dioxide, silica, magnesium hydroxide, calcium borate ore, colemanite, and mixtures thereof.

Intumescent Materials

In one or more embodiments, intumescent materials include expandable graphite, which may also be referred to as expandable flake graphite, intumescent flake graphite, or expandable flake, includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, CA) and Expandable Graphite Grades 1721 (Asbury Carbons, Asbury, NJ). Other commercial grades contemplated as useful in the present invention include 1722, 3393, 3577, 3626, and 1722HT (Asbury Carbons, Asbury, NJ).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 75% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite may be characterized as having a pH in the range from about 1 to about 12; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

Preparation of Construction Boards

Generally speaking, the construction boards of the present invention can be prepared by using known techniques that are adapted in view of the teachings of this invention. In general, processes for the manufacture of polyurethane or polyisocyanurate insulation boards are known in the art as described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which are incorporated herein by reference.

As the skilled person appreciates, foam may be produced by developing or forming polyurethane and/or polyisocyanurate foam in the presence of a blowing agent. The foam may be prepared by contacting an A-side stream of reagents with a B-side stream of reagents and depositing the mixture or developing foam onto a laminator carrying a facer, which may include one or more of the coating and/or fire-resistant layers described herein. The A-side stream may include an isocyanate compound and the B-side may include an isocyanate-reactive compound.

A-Side Stream

As suggested above, the A-side stream includes an isocyanate. Suitable isocyanate-containing compounds useful for the manufacture of polyisocyanurate construction board are generally known in the art and embodiments of this invention are not limited by the selection of any particular isocyanate-containing compound. Useful isocyanate-containing compounds include polyisocyanates. Useful polyisocyanates include aromatic polyisocyanates such as diphenyl methane diisocyanate in the form of its 2,4'-, 2,2'-, and 4,4'-isomers and mixtures thereof. The mixtures of diphenyl methane diisocyanates (MDI) and oligomers thereof may be referred to as "crude" or polymeric MDI, and these polyisocyanates may have an isocyanate functionality of greater than 2. Other examples include toluene diisocyanate in the form of its 2,4' and 2,6'-isomers and mixtures thereof, 1,5-naphthalene diisocyanate, and 1,4' diisocyanatobenzene. Exemplary polyisocyanate compounds include polymeric Rubinate 1850 (Huntsmen Polyurethanes), polymeric Lupranate M70R (BASF), and polymeric Mondur 489N (Bayer).

B-Side Stream

As suggested above, the B-side stream includes an isocyanate-reactive compound, and may also include flame retardants, catalysts, emulsifiers/solubilizers, surfactants, blowing agents, fillers, fungicides, anti-static substances, water and other ingredients that are conventional in the art.

An exemplary isocyanate-reactive component is a polyol. The term polyol, or polyol compound, includes diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Invista), and a blended polyol TR 564 (Huntsman). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one or more embodiments, a polyester polyol is employed. In one or more embodiments, the present invention may be practiced in the appreciable absence of any polyether polyol. In certain embodiments, the ingredients are devoid of polyether polyols.

Catalysts are believed to initiate the polymerization reaction between the isocyanate and the polyol, as well as a trimerization reaction between free isocyanate groups when polyisocyanurate foam is desired. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris[(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components.

Surfactants may serve two purposes. First, they may help to emulsify/solubilize all the components so that they react completely. Second, they may promote cell nucleation and cell stabilization. Exemplary surfactants include silicone copolymers or organic polymers bonded to a silicone polymer. Although surfactants can serve both functions, a more cost effective method to ensure emulsification/solubilization may be to use enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant 58522, and GE 6912. U.S. Pat. Nos. 5,686,499 and 5,837,742 are incorporated herein by reference to show various useful surfactants.

Suitable emulsifiers/solubilizers include DABCO Ketene 20AS (Air Products), and Tergitol NP-9 (nonylphenol+9 moles ethylene oxide).

Useful blowing agents include isopentane, n-pentane, cyclopentane, alkanes, (cyclo) alkanes, hydrofluorocarbons, hydrochlorofluorocarbons, fluorocarbons, fluorinated ethers, alkenes, alkynes, carbon dioxide, hydrofluoroolefins (HFOs) and noble gases.

Flame Retardants may be used in the production of polyurethane and polyisocyanurate foams, especially when the foams contain flammable blowing agents such as pentane isomers. Useful flame retardants include tri(monochloropropyl) phosphate (a.k.a. tris (cloro-propyl) phosphate), tri-2-chloroethyl phosphate (a.k.a tris (chloro-ethyl) phosphate), phosphonic acid, methyl ester, dimethyl ester, and diethyl ester. U.S. Pat. No. 5,182,309 is incorporated herein by reference to show useful blowing agents.

Exemplary non-halogenated solid flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), melamine polyphosphate is available under the tradename Budit™ 3141 (Budenheim), and antimony oxide ($Sb_2O_3$) is commercially available under the tradename Fireshield™. Exemplary non-halogenated liquid flame retardants include triethylphosphate, such as that available under the tradename TEP (Lanxess). Exemplary reactive flame retardants include liquid reactive phosphates such as those available under the tradenames E06-16 (ICL) FYROL (ICL).

The respective streams can be mixed within, for example, a mixhead to produce a reaction mixture. The mixture can then be deposited onto a facer that is positioned within and carried by a laminator. In accordance with the present invention, the mixture can be deposited onto a facer having opposed coating layers as described above (e.g., the external coating layer and the interfacial coating layer). Specifically, the foam mixture is deposited directly onto the planar surface of the facer carrying the interfacial coating layer.

While in the laminator, the reaction mixture rises and can be married to a second facer to form a composite, which may also be referred to as a laminate, wherein the foam is sandwiched between upper and lower facers. Likewise, in accordance with this invention, the second facer may carry a pair of opposed coating layers. In one or more embodiments, the facer is mated with the rising foam so that the interfacial coating layer of the second facer contacts the rising foam.

In one or more embodiments, the coating layers carried by the facer are applied to a glass mat substrate by applying a liquid coating composition by employing conventional coating techniques. For example, one or both coatings may be applied by gravure coating, reverse roll coating, slot die coating, immersion (dip) coating, knife coating, electrohydrodynamic spraying, and the like. In one or more embodiments, these liquid coating compositions (i.e., those forming 20, 20') may include at least 0.5 wt. %, in other embodiments at least 1.0 wt. %, in other embodiments at least 3 wt. %, in other embodiments at least 5 wt. %, and in other embodiments at least 7 wt. % filler, based on the entire weight of the liquid composition. In these or other embodiments, these liquid coating compositions include at most 40 wt. %, in other embodiments at most 30 wt. %, in other embodiments at most 25 wt. %, in other embodiments at most 20 wt. %, and in other embodiments at most 15 wt. % filler, based on the entire weight of the liquid composition. In one or more embodiments, these liquid coating compositions include from about 0.5 to about 40, in other embodiments from about 1 to about 25, and in other embodiments from about 2 to about 20 wt. % filler, based upon the entire weight of the liquid composition.

Similarly, the interfacial coating, which forms the interfacial layers, is applied to respective substrates in the form of a liquid coating composition that includes expandable graphite. As the skilled person will appreciate, this coating, including the expandable graphite, is applied to a planar surface of the substrate that is opposite the planar surface where the external coating may be applied. The coating composition forming interfacial layers may be applied by gravure coating, reverse roll coating, slot die coating, immersion (dip) coating, knife coating, electrohydrodynamic spraying, and the like. In one or more embodiments, these liquid coating compositions may include at least 0.5 wt. %, in other embodiments at least 1.0 wt. %, in other embodiments at least 3 wt. %, in other embodiments at least 5 wt. %, and in other embodiments at least 7 wt. % expandable graphite, based on the entire weight of the liquid composition. In these or other embodiments, these coating compositions include at most 40 wt. %, in other embodiments at most 30 wt. %, in other embodiments at most 25 wt. %, in other embodiments at most 20 wt. %, and in other embodiments at most 15 wt. % fire-resistant material (e.g., expandable graphite), based on the entire weight of the liquid composition. In one or more embodiments, these compositions include from about 0.5 to about 40, in other embodiments from about 1 to about 25, and in other embodiments from about 2 to about 20 wt. % expandable graphite, based upon the entire weight of the liquid composition.

In one or more embodiments, the coating layers, as well as the penetrated coating material, allow for a relatively high degree of air permeability of the facer. In one or more embodiments, the coating layers are discontinuous or irregular (e.g., have an irregular thickness), and the penetrated coating may not fill all of the interstices of the mat, either of which may contribute to the relatively high degree of air permeability of the facer.

In one or more embodiments, where the facer includes external and internal coating layers (e.g., layers 16 and 30), as well as interfacial coating layer (e.g., 20), derives from employing a double-coated glass mat, which is a glass mat that includes a coating material, including inert filler, applied to both planar surfaces of the glass mat. Any method suitable for applying a binding composition or coating to a glass fiber mat or impregnating a glass fiber mat with a binding composition or coating may be used to apply the first binding composition to the upper surface of the at least one glass fiber mat and the second binding composition to the lower surface of the at least one glass fiber mat. For example, the first and second binding composition can be applied by air spraying, dip coating, knife coating, roll coating, or film application such as lamination/heat pressing. The ability to produce coated facers is known as described in U.S. Pat. Nos. 5,102,728, 5,112,678, and 7,138,346, which are incorporated herein by reference.

In one or more embodiments, the double-coated facer is characterized by an air permeability, which may also be referred to as porosity, as determined by ARC-WT-006 (which correlates to TAPPI T460om-96), of less than 300, in other embodiments less than 250, in other embodiments less than 200, in other embodiments less than 150, in other embodiments less than 100, in other embodiments less than 70, in other embodiments less than 50, in other embodiments less than 40, and in other embodiments less than 30 Gurley seconds/300 cubic centimeters.

In one or more embodiments, the double-coated facer is characterized by a coating weight of greater than 500, in other embodiments greater than 600, in other embodiments greater than 700, in other embodiments greater than 800, in other embodiments greater than 810, in other embodiments greater than 820, in other embodiments greater than 830, in other embodiments greater than 840, in other embodiments greater then 850, in other embodiments greater then 860, in other embodiments greater 870, in other embodiments greater 880, in other embodiments greater than 890, and in other embodiments greater than 900 grams per square meter. In one or more embodiments, the coating weight is less than 1000, in other embodiments less than 950, and in other embodiments less than 920 grams per square meter. As used herein, the term "coating weight" means the weight of the coating per area of the at least one glass fiber mat, which includes both coating layers as well as the penetrated coating material.

The composite, while in laminator, or after removal from laminator, is exposed to heat that may be supplied by, for example, oven. For example, laminator may include an oven or hot air source that heats the slats and side plates of the laminator and there through transfers heat to the laminate (i.e., to the reaction mixture). Once subjected to this heat, the foam composite can undergo conventional finishing within a finishing station, which may include, but is not limited to, trimming and cutting.

INDUSTRIAL APPLICABILITY

In one or more embodiments, the construction boards of this invention may be employed in roofing or wall applications. In particular embodiments, the construction boards are used in flat or low-slope roofing system.

Figure 3:
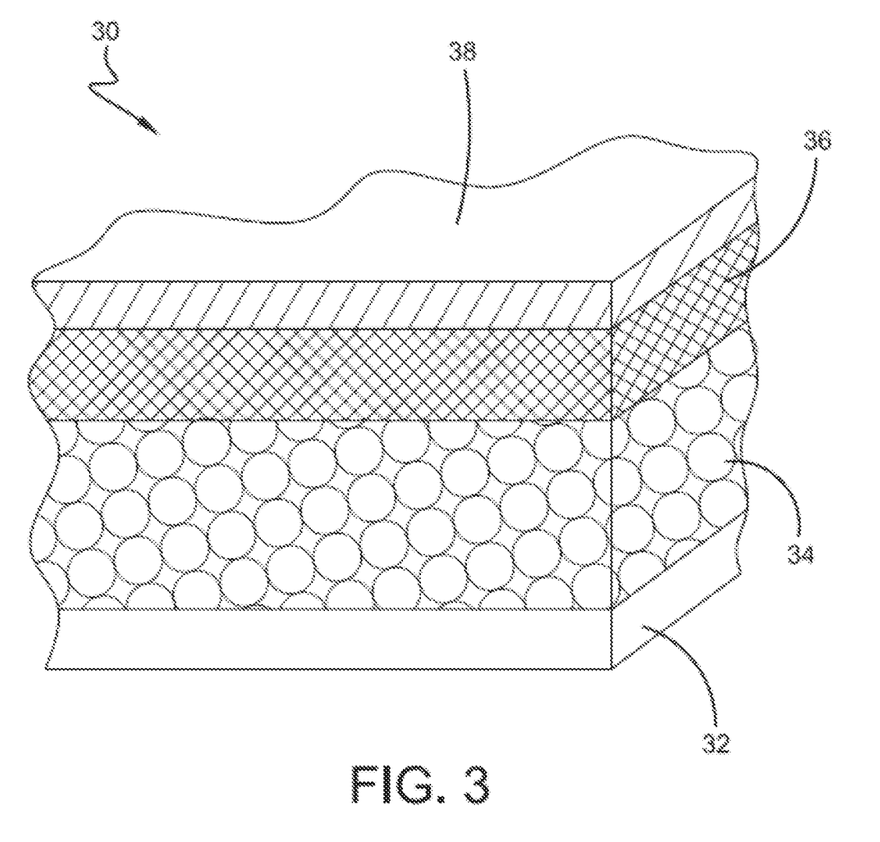
FIG. 3 is a perspective view of a roofing system according to aspects of the present invention.

As shown in FIG. 3, roofing system 30 includes a roof deck 32 having insulation board 34, which may be fabricated according to practice of this invention, disposed thereon. An optional high density board 36, which may also be fabricated according to practice of this invention, positioned above, relative to the roof deck, insulation board 34. A water-protective layer or membrane 38 is disposed on top or above high density board 36. In alternate embodiments, not shown, optional high density board 36 may be below insulation board 34 relative to the roof deck.

Practice of this invention is not limited by the selection of any particular roof deck. Accordingly, the roofing systems of this invention can include a variety of roof decks. Exemplary roof decks include concrete pads, steel decks, wood beams, and foamed concrete decks.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700, 538, 5,703,154, 5,804,661, 5,854,327, 5,093,206, and 5,468, 550, which are incorporated herein by reference. Other useful polymeric membranes include those made from various thermoplastic polymers or polymer composites. For example, thermoplastic olefin (i.e., TPO), thermoplastic vulcanizate (i.e., TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Still in other embodiments, the protective membrane can include bituminous or asphalt membranes. In one embodiment, these asphalt membranes derive from asphalt sheeting that is applied to the roof. These asphalt roofing membranes are known in the art as described in U.S. Pat. Nos. 6,579, 921, 6,110,846, and 6,764,733, which are incorporated herein by reference. In other embodiments, the protective membrane can derive from the application of hot asphalt to the roof.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The construction boards of this invention can be secured to a building structure by using various known techniques. For example, in one or more embodiments, the construction boards can be mechanically fastened to the building structure (e.g., the roof deck). In other embodiments, the construction boards can be adhesively secured to the building structure.

Various modifications and alterations that do not depart from the scope and spirit of this invention will become apparent to those skilled in the art. This invention is not to be duly limited to the illustrative embodiments set forth herein.

What is claimed is:

1. A construction board comprising:
a foam body having first and second planar surfaces, said foam body including a polyisocyanurate foam matrix defining a plurality of closed cells, said closed cells being substantially devoid of hydrocarbon blowing agents, and said foam body being characterized by a density, pursuant to ASTM C303, of at least 2.5 lbs/ft$^3$; and
a facer disposed on a planar surface of said foam body, said facer including a glass substrate having an internal planar surface proximate to said foam body and an external planar surface opposite said foam body, a first coating disposed on said external surface, and a second coating disposed on or proximate to said internal surface, where said first coating disposed on said external surface includes an inert filler, and where said second coating disposed on or proximate to said internal surface includes intumescent material,
where said first coating includes a first polymeric binder in which said inert filler is dispersed,
where said second coating includes a second polymeric binder in which said intumescent material is dispersed, and wherein said second polymeric binder is devoid of polyurethane.

2. The construction board of claim 1, where said inert filler includes calcium carbonate.

3. The construction board of claim 1, where said intumescent material includes expandable graphite.

4. The construction board of claim 1, said foam being characterized by an ISO Index of from at least 220 to less than 360.

5. The construction board of claim 1, said closed cells including carbon dioxide, air, or a partial vacuum, and less than 0.5 percent by volume of said hydrocarbon blowing agents.

6. The construction board of claim 1, where said facer is a first facer, and where said construction board includes a second facer disposed on one of the first and second planar surfaces of said foam body opposite said first facer, said second facer including
 a glass substrate having an internal planar surface proximate to said foam body and an external planar surface opposite said foam body,
 a first second facer coating disposed on said external planar surface, and
 a second second facer coating disposed on or proximate to said internal planar surface, where said first second facer coating disposed on said external planar surface includes an inert filler, and where said second second facer coating disposed on or proximate to said internal planar surface includes intumescent material.

7. The construction board of claim 1, where said second polymeric binder for said second coating is selected from the group consisting of natural rubber, waxes, and starches.

8. The construction board of claim 1, where said second polymeric binder for said second coating is selected from the group consisting of polyolefins, styrene-butadiene copolymers, acrylic polymers, methacrylic polymers, silicones, and copolymers thereof including functional copolymers thereof.

9. The construction board of claim 1, where said second polymeric binder for said second coating includes styrene-butadiene polymers bearing one or more hydrophobic moieties for repelling water, where the one or more hydrophobic moieties for repelling water are fluorine-containing groups.

10. The construction board of claim 1, where the inert filler is present in an amount of from 3 to 30 weight percent with respect to an entire weight of the first coating.

11. The construction board of claim 1, where the construction board has zero flame spread and zero smoke development when tested in accordance with ASTM E84.

12. The construction board of claim 1, where the construction board can achieve FM class 1 approvals for a steel deck insulated roof without the use of gypsum-based coverboards.

13. The construction board of claim 1, said foam being characterized by an ISO Index of from at least 275 to less than 340.

14. A roofing system comprising:
 (i) a roof deck,
 (ii) a construction board including:
 a foam body having first and second planar surfaces, said foam body including a polyisocyanurate foam matrix defining a plurality of closed cells, said closed cells being substantially devoid of hydrocarbon blowing agents, and said foam body being characterized by a density, pursuant to ASTM C303, of at least 2.5 lb/ft$^3$, and
 a facer disposed on a planar surface of said foam body, said facer including a glass substrate having an internal planar surface proximate to said foam body and an external planar surface opposite said foam body, a first coating disposed on said external surface, and a second coating disposed on or proximate to said internal surface, where said first coating disposed on said external surface includes an inert filler, and where said second coating disposed on or proximate to said internal surface includes intumescent material,
 where said first coating includes a first polymeric binder in which said inert filler is dispersed,
 where said second coating includes a second polymeric binder in which said intumescent material is dispersed, and wherein said second polymeric binder is devoid of polyurethane,
 said construction board being disposed on said roof deck, and
 (iii) a water-protective layer disposed on top of or above said construction board.

15. The roofing system of claim 14, where the roofing system meets the requirements of UL 790 without the use of gypsum-based construction boards.

16. A method of installing a roofing system, the method comprising steps of:
 (i) providing a roof deck,
 (ii) installing a construction board on said roof deck, the construction board including:
 a foam body having first and second planar surfaces, said foam body including a polyisocyanurate foam matrix defining a plurality of closed cells, said closed cells being substantially devoid of hydrocarbon blowing agents, and said foam body being characterized by a density, pursuant to ASTM C303, of at least 2.5 lb/ft$^3$; and
 a facer disposed on a planar surface of said foam body, said facer including a glass substrate having an internal planar surface proximate to said foam body and an external planar surface opposite said foam body, a first coating disposed on said external surface, and a second coating disposed on or proximate to said internal surface, where said first coating disposed on said external surface includes an inert filler, and where said second coating disposed on or proximate to said internal surface includes intumescent material,
 where said first coating includes a first polymeric binder in which said inert filler is dispersed,
 where said second coating includes a second polymeric binder in which said intumescent material is dispersed, and wherein the second polymeric binder is devoid of polyurethane, and
 (iii) installing a water-protective layer on top of or above the construction board.

17. The method of claim 16, where the roofing system meets the requirements of UL 790 without the use of gypsum-based construction boards, where the construction board has zero flame spread and zero smoke development when tested in accordance with ASTM E84.

* * * * *